Patented June 26, 1928.

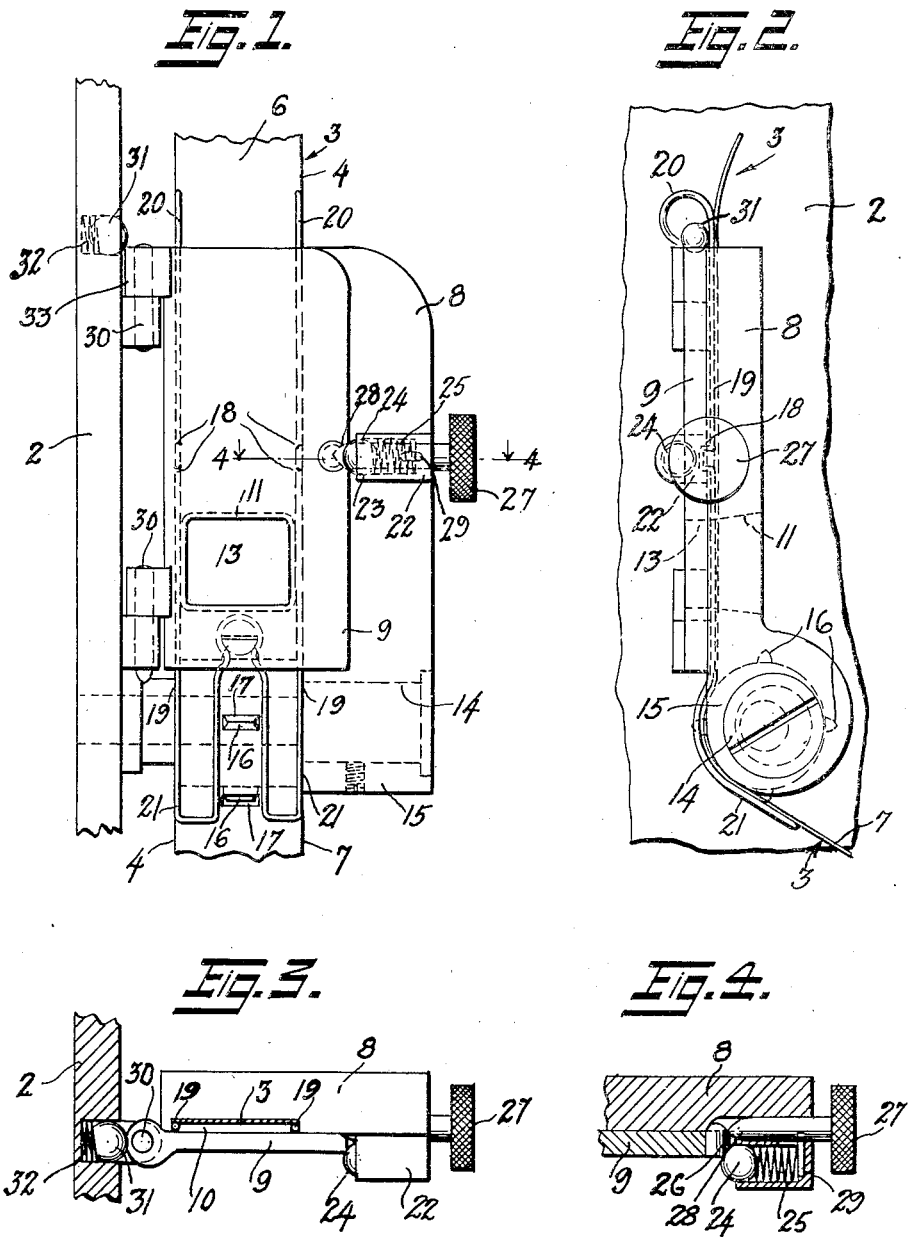

1,674,629

UNITED STATES PATENT OFFICE.

GERALD J. BADGLEY, OF BROOKLYN, NEW YORK, ASSIGNOR TO DUPLEX MOTION PICTURE INDUSTRIES, INC., A CORPORATION OF DELAWARE.

MOTION-PICTURE PROJECTOR.

Application filed May 23, 1924. Serial No. 715,352.

This invention relates to improvements in motion picture projectors, and it has for its object the provision in apparatus of this class of improved means for positioning and positively holding in a plane that portion of a strip of film which is being projected as well as portions preceding and following the portion being projected.

An important object of the invention is the provision of a simple and effective backing and positioning means for the film of motion picture projectors, said means being preferably in the form of a backing-plate or equivalent member having guiding means thereon for the section of film being projected, and an enclosing gate or equivalent device adapted to coact with the backing plate to hold that section of a strip of film being projected in a plane, yielding pressure means being provided on said enclosing gate for pressing the strip of film against the backing plate, contact of said pressure means with the film being along narrow lines near the margins thereof.

In the embodiment of the invention as illustrated, I provide a gate adapted to coact with a backing plate for a strip of film, said gate carrying parallel to its surface and slightly raised therefrom spring-wire pressure members so carried by the gate as to assure an even pressure upon the active portion of the film to hold it yildingly in a plane against the backing plate, the means employed herein permitting free movement of the enclosed film while holding it in such a way as to prevent all sagging thereof as it reaches the projecting point. With pressure means as described destructive rubbing of the film surface and consequent removal of portions thereof is avoided.

Other features relates to improved means for guiding a film strip as it emerges from the pressure means referred to, to means for holding said strip in engagement with the teeth of a film-actuating member, and to improved latching means between the pressure means and a backing member for the film.

The foregoing, and other objects of the invention not hereinbefore referred to will be hereinafter described and claimed, and are illustrated in the accompanying drawing, in which:

Figure 1 is a front elevation of film positioning and holding means embodying my invention;

Fig. 2 is a side elevation of the same;

Fig. 3 is a top plan view thereof, partly in section;

Fig. 4 is a section, on line 4—4, Fig. 1, of the latching means shown herein.

Referring to the drawings, 2 designates a portion of the frame of a motion picture projector, this frame being adapted for carrying the mechanism necessary for effecting an intermittent progressive movement of a strip of film, designated generally by 3. Said strip of film may be led in any well-known way from a reel or equivalent device past a projecting lens, after which it may be taken up by another reel. The means for securing such intermittent progressive movement of the film and the means for winding and unwinding thereof are not shown herein, they forming no part of the present invention.

In the present invention my object is to provide means for effecting a positive yielding pressure on the film section 5 being projected and on sections immediately preceding and following the same, this pressure being applied at the outer margins 4 and 7 of the film and is also applied, preferably, to those portions of said film 6—7 immediately preceding and immediately following said projected section. By use of the means illustrated herein the pressure applied will positively but yieldingly hold the active section and adjacent portions of the film strip in a flat plane substantially parallel with the lens surface, and thereby prevent any sagging or unevenness or any movement of the film section that would tend to affect its focus. To effect the object just stated I have illustrated a device, including a backing-plate 8 mounted on the frame 2 of the apparatus and a gate 9 adapted for coaction therewith. A guideway 10 is shown in the surface of the backing-plate 8, and an aperture 11 in said backing-plate is positioned in focal alinement with a lens and a source of light (not shown). An aperture 13 in the gate 9 is provided in register with the aperture 11 in the backing-plate 8. Said backing-plate 8 is illustrated herein as having formed integrally therewith the means 14 for carrying engaging and feeding means 15 for the film-strip, said feeding means being adapted for actuation by the mechanism before referred to for effecting the intermittent progressive movement of the film-strip. Sprocket teeth 16 on the feeding means 15 are shown so spaced as to engage with perforations 17 in a strip of film, coaction of said projections 16 and the perforations 17 serving to impart progressive movement to that portion of the film-strip passing before the aperture 11—13, which movement is rendered intermittent by means of mechanism well understood in the art but not shown herein.

The gate 9 is illustrated herein as provided with openings 18 adjacent its inner face and the opposite sides of the guideway 10, through each of which is passed a strand of spring wire 19, such as fine piano wire, in such a manner as to hold it parallel with but spaced slightly away from the surface of the gate 9, and adapted to exert yielding pressure on the margins 4 and 7 of the film strip along an extremely narrow contacting line when the gate is closed. The upper ends of the wires 18 are shown as extending somewhat above the top of the gate 9 and formed with loops 20, said loops resting on the top of the gate and thereby supporting the wires 19. The lower portions 21 of said wires 19 are illustrated as extending below the gate 9 and curved inward in such a way as to form inturned fingers substantially parallel with the surface of the feeding means 15. When the gate 9 is closed the film 3 will be directed by the fingers 21 at such an angle as to assure certainty of engagement of the perforations 17 by the teeth 16 and consequent certainty of feed of said film 3 past the registering apertures 11—13. The curved fingers 21 while thus guiding the outgoing portions of the film strip 3 will exert only a slight yielding pressure upon the surfaces of said strip, they serving merely as film-directing means. The intermediate portions of the wires 19 being so placed as to stand somewhat away from the surface of the gate 9 when the gate is open, are adapted, on closing of said gate, to press yieldingly upon the marginal portions of the film sections enclosed between said gate 9 and the backing-plate 8, this portion of the film-strip being located and moving in the guideway 10 of said backing-plate. As shown, the film-presser portions 19 are located in such a manner as to exert marginal pressure, that is pressure at each edge of the strip, just outside the portion carrying the pictures to be projected.

Any desired means may be employed for holding the gate 9 in closed position for coaction with the backing-plate 8 and for releasing the same when required, but I prefer to employ for this purpose and have illustrated herein a ball-and-spring latch carried by said backing-plate. Said latch embodies a boss 22 on said backing-plate 8, a ball seat 23 therein and a ball 24 carried on said seat and adapted to protrude somewhat beyond the end of the boss 22 when said ball 24 is pressed to its seat by the spring 25. When the gate 9 is swung to its closed operative position the ball 24 will be forced back from its seat 23, this action compressing the spring 25 until the edge 26 of the gate 9 has neared its limit of movement, at which time pressure on the ball will be removed, whereupon said ball 24 will be forced by its spring 25 to its seat 23 and press the gate to a tightly locked position. When the gate is to be opened pressure on the thumb-piece 27 will cause insertion of the wedge portion formed on the inner end of the pin 28 thereof behind the beveled inner edge 26 of the gate 9 and force said gate edge 26 outward, this resulting in causing said edge 26 to press the ball 24 back against its spring 25 until the gate edge 26 surmounts the face of said ball, whereupon the pressure on said ball will cause the gate 9 to be thrown to its open position. It will be seen that the pin 29 carried by said thumb-piece 27 serves to compress the spring 25 when pressure is applied to said thumb-piece and also serves to retain it within the boss 22.

The spring wire pressure means herein described for holding the film has many advantages over means heretofore used for pressing a strip of film to a backing member. As the object sought is the provision of such means having the least possible area of contact with the strip, the means herein, embodying thin wires having contact with the strip only along very narrow, thread-like lines, have been found to overcome the difficulties heretofore present in devices of this class, these difficulties including, especially when new film is being used, tendency of the pressure means to adhere to the film surface, resulting frequently in the stripping of said surface and other mutilation thereof. The highly polished surface of such wire, in connection with the slight contact lines, serves further to insure free movement of the film at the same time that sufficient pressure is applied.

The gate 9 is so hung as to permit removal thereof, the pins 30 being secured in the upper and lower hinge knuckles 33 thereof. To prevent accidental unhinging I have shown a retaining device, positioned in the frame 2 adjacent the upper hinge knuckle 33, comprising a ball-and-spring latch in which a ball 31 is pressed by a spring 32 to a seat in the frame 2 and abut against the top of the hinge knuckle 33. To remove the gate, upward pull thereon will force the ball 31 against the spring 32 and permit such removal.

What I claim is:—

1. In a motion picture projector, the combination with means adapted to move a strip of film in intermittent progression to bring successive portions thereof into projecting position, of backing means for said film portions, a gate and spring-wire pressure members resiliently mounted on said gate in a fixed position and adapted to coact with the marginal portions of a film along narrow lines of contact to press said film portions against the backing means.

2. In a motion picture projector, the combination with means adapted to move a strip of film in intermittent progression to bring successive portions thereof into projecting position, of backing means for said film portions, a gate and pressure members of fine piano-wire resilient throughout their length carried by said gate and adapted to coact with the marginal portions of a film along narrow lines of contact to press said film portions yieldingly against the backing means.

3. In a motion picture projector, the combination with means for feeding successive portions of a strip of film past an aperture and with means for momentarily arresting said movement, of a backing member for said portions of film, a gate adapted to co-operate with said backing member and having thereon spring-pressure wires adapted to exert yielding pressure along each side margin of said exposed portion to press it to the backing member, said pressure wires being looped at their upper ends and supported against said gate.

4. In a motion picture projector, the combination with means adapted to move a strip of film in intermittent progression to bring successive portions thereof into projecting position, of a backing-plate for said film portions, a gate adapted to co-operate with said backing-plate and carrying thereon spring-pressure wires resilient throughout their length positioned parallel with and spaced away from said gate and adapted to exert yielding pressure along each side margin of the film portions to press them to the backing-plate.

5. In a motion picture projector, the combination with feeding means for a strip of film, of backing means for the film, a gate adapted for co-operation with said backing means, pressure means for said film carried by said gate, a ball-and-spring latch carried by said backing means and positioned to engage and hold said gate in closed position, and a push pin mounted adjacent said latch and provided with a wedge portion formed on its inner end adapted to engage and release the gate from said latch.

6. In a motion picture projector, the combination with feeding means for a strip of film, of backing means for said film, a gate adapted for co-operation with said backing means to enclose the film, pressure wires for said film carried by said gate, a spring-pressure ball latch the ball of which is adapted to be depressed to permit closing of the gate against the backing means, and a thumbpiece having a cam portion adapted to force the gate open against the action of the spring-pressed ball.

7. In a motion picture projector, the combination with feeding means for a strip of film, of backing means for said film, a gate hinged to the frame of the projector and adapted for co-operation with said backing means to enclose the film, means for permitting said gate to be removed from its hinges, on said frame, and a spring-pressed ball latch carried by said frame and coacting with the hinged portion of the gate to oppose removal of said gate from the frame.

Signed at New York, in the county of New York, and State of New York, this 2nd day of May, A. D. 1924.

GERALD J. BADGLEY.